(12) United States Patent
Fukuda et al.

(10) Patent No.: US 7,598,336 B2
(45) Date of Patent: Oct. 6, 2009

(54) TWO-PART CURING HIGH-DURABLE POLYURETHANE ELASTOMER COMPOSITION

(75) Inventors: Keisuke Fukuda, Chuo-ku (JP); Seiji Nagahisa, Isumi-gun (JP); Hiroshi Yamaguchi, Isumi-gun (JP)

(73) Assignee: Nihon Gosei Kako Co., Ltd., Chuo-Ku, Tokyo (JP)

( * ) Notice: Subject to any disclaimer, the term of this patent is extended or adjusted under 35 U.S.C. 154(b) by 502 days.

(21) Appl. No.: 10/582,356

(22) PCT Filed: Dec. 10, 2004

(86) PCT No.: PCT/JP2004/018462

§ 371 (c)(1),
(2), (4) Date: Jun. 9, 2006

(87) PCT Pub. No.: WO2005/056631

PCT Pub. Date: Jun. 23, 2005

(65) Prior Publication Data

US 2007/0083027 A1    Apr. 12, 2007

(30) Foreign Application Priority Data

Dec. 12, 2003 (JP) .............................. 2003-414385

(51) Int. Cl.
C08G 18/42 (2006.01)
C08G 18/48 (2006.01)
C08G 18/64 (2006.01)

(52) U.S. Cl. .......................... 528/74.5; 528/76; 528/77; 528/80; 528/81

(58) Field of Classification Search ................ 528/74.5, 528/80, 81, 76, 77
See application file for complete search history.

(56) References Cited

U.S. PATENT DOCUMENTS

| 4,546,120 A | * | 10/1985 | Peerman et al. ............. 521/159 |
| 4,551,517 A | * | 11/1985 | Herold et al. .................. 528/60 |
| 6,730,768 B2 | * | 5/2004 | Heidbreder et al. ........... 528/65 |

FOREIGN PATENT DOCUMENTS

| JP | 63-057626 A | 3/1988 |
| JP | 01-203421 A | 8/1989 |
| JP | 4-96916 A | 3/1992 |
| JP | 06-220157 A | 8/1994 |
| JP | 07-102033 A | 4/1995 |
| JP | 8-507809 A | 8/1996 |
| JP | 11-50086 A | 2/1999 |
| JP | 2003-292563 A | 10/2003 |

* cited by examiner

*Primary Examiner*—Rabon Sergent
(74) *Attorney, Agent, or Firm*—Buchanan Ingersoll & Rooney PC

(57) ABSTRACT

A two-part curing high-durable polyurethane elastomer composition having excellent heat resistance and wet heat resistance, and excellent workability such that a viscosity after two-part mixing is suitable for casting workability which comprises (i) a polyisocyanate component, and (ii) an active hydrogen-containing compound comprising (A) a polyol having a hydroxyl value of from 25 to 55 obtained by reacting a castor oil fatty acid, 12-hydroxystearic acid, or a condensate of their fatty acids, with a polyol (X) having a molecular weight of from 400 to 1,500, and (B) a polyol having a hydroxyl value of from 100 to 500 obtained by ring opening an epoxidized fatty acid ester with a polyhydric alcohol.

4 Claims, No Drawings

TWO-PART CURING HIGH-DURABLE POLYURETHANE ELASTOMER COMPOSITION

TECHNICAL FIELD

The present invention relates to a two-part curing high-durable polyurethane elastomer composition.

More particularly, the invention relates to a two-part curing high-durable polyurethane elastomer composition having excellent heat resistance and wet heat resistance, and low viscosity after two-part mixing, thereby having good casting workability.

BACKGROUND ART

A two-part curing polyurethane elastomer composition has excellent physical properties of a cured product, such as strength, elongation, elastic modulus and the like, and therefore is widely used in applications such as a water-proof material, a floor material, a pavement material, an adhesive, a sealing material and the like. The two-part curing polyurethane elastomer composition is cured by stirring and mixing a curing agent comprising an active hydrogen-containing compound as a main component and a base resin comprising a polyisocyanate component as a main component, and executing with a trowel, a spatula, a roller or the like, or casting in a mold. Therefore, where the viscosity after two-part mixing is high, bubbles are liable to be included when executing with a trowel, a spatula, a roller or the like, resulting in deterioration of appearance and performance. Further, where casting in a mold, inclusion of bubbles is large, and casting workability deteriorates such that fine spaces cannot be filled with a composition.

Conventionally, a production method of a two-part curing polyurethane elastomer composition comprising an active hydrogen-containing compound and a polyisocyanate component is generally a prepolymer method using an isocyanate-terminated urethane polymer obtained by reacting an organic polyisocyanate and a polyol with an equivalent ratio of an isocyanate group to an active hydrogen group being 2.0 or less. Other methods are a semi-one shot method using a partial prepolymer obtained by reacting an organic polyisocyanate as a polyisocyanate component and a polyol with an equivalent ratio of an isocyanate group to an active hydrogen group exceeding 2.0, and a one shot method using an organic polyisocyanate alone.

Examples of the active hydrogen-containing compound to be reacted with the polyisocyanate component include a polyether polyol such as a polytetramethylene ether glycol obtained by ring opening polymerization of tetrahydrofuran, and a polyoxyalkylene polyol obtained by addition polymerizing at least one of alkylene oxides such as ethylene oxide, propylene oxide and butylene oxide, with a polyhydric alcohol such as propylene glycol, dipropylene glycol, glycerin and trimethylol propane; a polyester polyol obtained by condensation polymerization of at least one polyhydric alcohol such as ethylene glycol, propylene glycol, diethylene glycol, butanediol, pentanediol and hexanediol, and at least one of malonic acid, maleic acid, succinic acid, adipic acid, glutaric acid, sebacic acid, phthalic acid, isophthalic acid, terephthalic acid, and the like; and a polyester polyol obtained by ring opening polymerization of caprolactone or the like.

However, where a polyether polyol is used as the active hydrogen-containing compound, a cured product has relatively good wet heat resistance, but has poor heat resistance. On the other hand, where a polyester polyol is used, heat resistance is relatively good, but wet heat resistance is poor.

As a method for improving heat resistance and wet heat resistance, it is proposed to use a hydride of a hydroxyl group-containing liquid polyisoprene as the active hydrogen-containing compound (JP-A-63-57626, JP-A-1-203421, JP-A-6-220157, JP-A-7-102033, and the like). However, when the hydride of a hydroxyl group-containing liquid polyisoprene proposed in those patent publications is used, a composition has high viscosity, and when executing with a trowel, a spatula, a roller or the like after two-part mixing, bubbles are liable to be included, resulting in deterioration of appearance and performance. Further, in the case of casting in a mold, there are the disadvantages that inclusion of bubbles is large, and fine spaces cannot be filled with a composition.

The prior art information of this invention is as follows; JP-A-63-57626, JP-A-1-203421, JP-A-6-220157 and JP-A-7-102033.

DISCLOSURE OF THE INVENTION

An object of the invention is to provide a two-part curing high-durable polyurethane elastomer composition that has improved heat resistance and wet heat resistance, and also has improved the viscosity after two-part mixing to the viscosity suitable for casting workability. In particular, it provides a polyol suitable for the objective composition, and the above composition having excellent heat resistance, wet heat resistance and casting workability using the same.

As a result of intensive investigations to solve the above problems, the present inventors have found that a two-part curing high-durable polyurethane elastomer composition having excellent heat resistance and wet heat resistance, and low viscosity after two-part mixing, thereby having good casting workability is obtained by using, as an active hydrogen-containing compound, (A) a polyol having a hydroxyl value of from 25 to 55 obtained by reacting a castor oil fatty acid, 12-hydroxystearic acid, or a condensate of their fatty acids, with a polyol (X) having a molecular weight of from 400 to 1,500, and (B) a polyol having a hydroxyl value of from 100 to 500 obtained by ring opening an epoxidized fatty acid ester with a polyhydric alcohol, and have reached the invention.

That is, the invention provides a two-part curing high-durable polyurethane elastomer composition comprising (i) a polyisocyanate component and (ii) an active hydrogen-containing compound, the active hydrogen-containing compound (ii) comprising (A) a polyol having a hydroxyl value of from 25 to 55 obtained by reacting a castor oil fatty acid, 12-hydroxystearic acid, or a condensate of their fatty acids, with a polyol (X) having a molecular weight of from 400 to 1,500, and (B) a polyol having a hydroxyl value of from 100 to 500 obtained by ring opening an epoxidized fatty acid ester with a polyhydric alcohol. The invention preferably provides the two-part curing high-durable polyurethane elastomer composition having excellent heat resistance and wet heat resistance, and low viscosity after two-part mixing, thereby having good casting workability, wherein the polyol (X) is a polyester polyol obtained by condensing adipic acid and a dihydric alcohol with trimethylolpropane, and the proportion of the polyol (B) is from 5 to 50 parts by weight per 100 parts by weight of the polyol (A). The invention further preferably provides the two-part curing high-durable polyurethane elastomer composition having hardness at 23° C. of JIS A 90 or lower, and elongation at break of 50% or higher.

EFFECT OF THE INVENTION

The two-part curing high-durable polyurethane elastomer composition of the invention has low viscosity after two-part mixing. Therefore, when the composition is executed with a trowel, a spatula, a roller or the like after two-part mixing, inclusion of bubbles does not involve, and even when casting in a mold, inclusion of bubbles does not involve. As a result, fine spaces can be filled with the composition. Further, a cured product of the composition has low hardness and large elongation at break. As a result, the cured product has excellent physical properties, and therefore has excellent heat resistance and wet heat resistance.

BEST MODE FOR CARRYING OUT THE INVENTION

In the two-part curing high-durable polyurethane elastomer composition of the invention, the active hydrogen-containing compound which is the main component of a curing agent comprises (A) a polyol having a hydroxyl value of from 25 to 55 obtained by reacting a castor oil fatty acid, 12-hydroxystearic acid, or a condensate of their fatty acids, with a polyol (X) having a molecular weight of from 400 to 1,500, and (B) a polyol having a hydroxyl value of from 100 to 500 obtained by ring opening an epoxidized fatty acid ester with a polyhydric alcohol.

In the polyol (A) used in the invention, the polyol (X) is preferably a polyester polyol obtained by condensing adipic acid and a dihydric alcohol with trimethylolpropane. Examples of the dihydric alcohol used include ethylene glycol, diethylene glycol, triethylene glycol, propylene glycol, dipropylene glycol, tripropylene glycol, butanediol, pentanediol, and hexanediol. The polyol (X) obtained has a molecular weight of from 400 to 1,500, and preferably from 500 to 1,000.

Where the polyol (A) obtained using the polyol (X) having a molecular weight of less than 400 is used, the polyurethane elastomer composition obtained does not have sufficient heat resistance. Where the polyol (A) obtained using the polyol (X) having a molecular weight exceeding 1,500 is used, the composition obtained has high viscosity, which is not preferable in the point of casting workability.

The polyol (A) is obtained by reacting a castor oil fatty acid, 12-hydroxystearic acid, or a condensate of their fatty acids, with the polyol (X), if necessary, by adding a catalyst such as paratoluenesulfonic acid, under a nitrogen gas stream at a reaction temperature of from 150 to 250° C. for several hours while distilling off by-product water outside the reaction system (for example, the method described in JP-A-11-50086).

The polyol (A) has a hydroxyl value of from 25 to 55, and preferably from 30 to 50. Where the hydroxyl value is less than 25, when a polyurethane elastomer composition is prepared, the composition does not cure completely, and necessary physical properties of the cured product are not obtained. Where the hydroxyl value exceeds 55, when a polyurethane elastomer composition is prepared, the hardness at 23° C. by JIS A exceeds 90. As a result, elongation at break decreases less than 50%, and physical properties of the cured product are not preferable.

The polyol (B) used in the invention is a polyol having a hydroxyl value of from 100 to 500 obtained by ring opening an epoxidized fatty acid ester with a polyhydric alcohol. The starting material of this polyol is a fatty acid ester, and can preferably obtained by ester interchange of vegetable oils and animal oils containing unsaturated fatty acid with an aliphatic alcohol having from 1 to 10 carbon atoms.

Examples of the vegetable oils and animal oils used include soybean oil, coconut oil, palm oil, castor oil, linseed oil, cotton seed oil, rapeseed oil, China wood oil, sunflower oil, safflower oil, rice bran oil, olive oil, camellia oil, corn oil, beef tallow, lard, fish oil, and whale oil.

Examples of the aliphatic alcohol used include methanol, ethanol, propanol, butanol, hexanol, heptanol, octanol, nonanol, and decanol. Methanol, ethanol and propanol are preferable.

The fatty acid ester can also be obtained by direct esterification of an unsaturated fatty acid such as oleic acid, linoleic acid, linolenic acid and recinoleic acid, and the aliphatic alcohol.

The epoxidized fatty acid ester is obtained by, for example, reacting an unsaturated bond with the fatty acid ester by the conventional method of reaction of formic acid/hydrogen peroxide, thereby forming an epoxide.

Ring opening of the epoxidized fatty acid ester uses a polyhydric alcohol having from 2 to 12, and preferably from 2 to 6, carbon atoms. Examples of the polyhydric alcohol include ethylene glycol, propylene glycol, butylene glycol, glycerin, and trimethylolpropane.

The ring opening reaction is conducted at a reaction temperature in a range of from 80 to 120° C. with an equivalent ratio of an epoxy group to a hydroxyl group being 5:1 to 1:5, preferably 2:1 to 1:2.

An inorganic acid or an organic carboxylic acid is used as a catalyst. Examples of the preferable catalyst include sulfuric acid, phosphoric acid, formic acid and acetic acid.

The polyol (B) has a hydroxyl value of from 100 to 500, and preferably from 150 to 400.

Where the hydroxyl value is less than 100, the polyol has high viscosity, resulting in deterioration of casting workability. Where it exceeds 500, when a polyurethane elastomer composition is prepared, hardness at 23° C. by JIS A exceeds 90. As a result, elongation at break decreases less than 50%, and physical properties of the cured product deteriorate.

The proportion of the polyol (B) is from 5 to 50 parts by weight, and preferably from 7.5 to 40 parts by weight, per 100 parts by weight of the polyol (A). Where the proportion of the polyol (B) is less than 5 parts by weight, when a polyurethane elastomer composition is prepared, the composition does not have sufficient wet heat resistance. Where the proportion exceeds 50 parts by weight, when a polyurethane elastomer composition is prepared, the composition has hardness at 23° C. by JIS A exceeding 90. As a result, elongation at break decreases less than 50%, resulting in deterioration of physical properties of the cured product.

Examples of the polyisocyanate used in the invention include an aromatic polyisocyanate such as 4,4'-dipheylmethane diisocyanate (MDI-PH), polymeric MDI (MDI-CR), carbodiimide-modified MDI (liquid MDI), and tolylene diisocyanate containing 65% or more of 2,4-isomers (TDI); and an aliphatic polyisocyanate such as norbornane diisocyanate (NBDI), isophorone diisocyanate (IPDI), hexamethylene diisocyanate (HDI), 4,4'-dicyclohexylmethane diisocyanate (hydrogenated MDI), and xylene diisocyanate (XDI). Of those polyisocyanates, MDI-PH, MDI-CR and liquid MDI are preferable.

The polyisocyanate used in the invention can be used alone or as mixtures thereof, and also can use a prepolymer obtained by heating a part of isocyanate groups together with a polyol in a nitrogen stream at from 60 to 100° C. for several hours.

Examples of the polyol include polyol (A), caster oil polyol, and polybutadiene polyol. Further, if necessary, a low molecular weight polyhydric alcohol may be used.

Examples of the low molecular weight polyhydric alcohol include ethylene glycol, diethylene glycol, propylene glycol, dipropylene glycol, 1,4-butanediol, 1,3-butanediol, pentanediol, hexanediol, glycerin and trimethylolpropane.

If necessary, the two-part curing high-durable polyurethane elastomer composition of the invention may contain an organic solvent such as toluene, xylene, methyl ethyl ketone and acetic ester; a plasticizer such as dibutyl phthalate, dioctyl adipate, dioctyl phthalate, diisononyl adipate and diisononyl phthalate; a high-boiling solvent such as a chlorinated paraffin and a petroleum hydrocarbon oil; a phosphoric ester flame retardant; an inorganic filler such as calcium carbonate, talc, clay, titanium oxide, carbon black and silica; a stabilizer such as an antioxidant and an ultraviolet absorber; and a water absorber such as molecular sieves, as a viscosity-reducing agent, and an organic lead oxide such as lead octylate and lead naphthenate; and an organic tin oxide such as dibutyltin dilaurate, as a curing agent.

The production method of the two-part curing high-durable polyurethane elastomer composition of the invention is not particularly limited, and the composition is obtained by uniformly mixing the active hydrogen component and the polyisocyanate component in a certain ratio with a stirrer, a low pressure casting machine, a spray machine or the like, and curing the resulting mixture in a range of from room temperature to 120° C.

EXAMPLES

The invention is specifically described below by referring to the Examples and the Comparative Examples, but the invention is not construed as being limited thereto. In the Examples and the Comparative Examples, "part" shows part by weight, and "%" shows wt %.

In the Examples and the Comparative Examples, the following polyol component and polyisocyanate component were used.

Polyol (B):
Sovamol 750: Polyol having a hydroxyl value of 315 (mgKOH/g) and a viscosity of 1,000 (mPa·s) (fat and oil-based polyol: a product of Cognis Japan Ltd.)

Polyoxypropylene Glycol:
D-3000: Diol having a hydroxyl value of 38 (mgKOH/g) (a product of Mitsui Takeda Chemicals, Inc.)
MN-300: Triol having a hydroxyl value of 300 (mg/KOH) (a product of Mitsui Takeda Chemicals, Inc.)

Hydride of Hydroxyl Group-Containing Polyisoprene:
Epol: Polyol having a number average molecular weight of 1,400, and a viscosity of 110,000 ((mPa·s) (a product of Idemitsu Petrochemical Co.)

Polyisocyanate Component:
Cosmonate PH: MDI-PH (a product of Mitsui Takeda Chemicals, Inc.)
Cosmonate LL: Liquid MDI (a product of Mitsui Takeda Chemicals, Inc.)
Cosmonate M-200: MDI-CR (a product of Mitsui Takeda Chemicals, Inc.)

Test of Physical Properties:
An active hydrogen-containing compound and a polyisocyanate compound in a predetermined ratio were uniformly stirred and mixed for 3 minutes. After defoaming, the mixture was flow cast on a slate plate equipped with a spacer so as to obtain a thickness of 2 mm, and cured at 80° C. for 10 hours. After aging at 23° C. for 7 days, test of physical properties was conducted.

Mixing Viscosity (25° C.):
An active hydrogen-containing compound and a polyisocyanate compound in a predetermined ratio, adjusted to 25° C. were uniformly stirred and mixed for 3 minutes, and a viscosity of the resulting mixture was measured with a B-type viscometer.

Casting Workability:
An active hydrogen-containing compound and a polyisocyanate compound were stirred in the same manner as in the preparation of 2 mm thick sheet, and the resulting mixture was cast in a mold of 100 mm×100 mm×3 mm. After curing, the resulting cured product was taken out of the mold, and the cast workability was judged by an appearance of the cured product.
◯: Bubbles are not included, and the mixture flows in up to the bottom.
X: Bubbles are largely included, or the mixture does not flow in up to the bottom.

Initial Hardness of Cured Product:
Five 2 mm thick sheets were piled, and hardness at 23° C. was measured according to JIS K6253.

Elongation at Break of Cured Product:
Measured according to JIS K6251

Heat Resistance of Cured Product:
The 2 mm thick sheet after measurement of the initial hardness was allowed to stand under an atmosphere at 150° C. for 2,000 hours, and then allowed to stand in a thermostat chamber at 23° C. for 7 days. Hardness of the sheet was measured according to JIS K6253.

Wet Heat Resistance of Cured Product:
The 2 mm thick sheet after measurement of the initial hardness was allowed to stand under an atmosphere at 121° C., 100% RH and steam pressure of 2 atm for 100 hours, and then allowed to stand in a thermostat chamber at 23° C. for 7 days. Wet heat resistance of the sheet was judged by appearance change.
◯: Shape of 2 mm thick sheet is maintained.
X: Shape of 2 mm thick sheet is not maintained, and the sheet dissolved.

Synthesis Example 1

1,000 parts of a polyester polyol having a molecular weight of 1,000 obtained by condensing trimethylolpropane, ethylene glycol and adipic acid, 2,384 parts of 12-hydroxystearic acid, and 3 parts of paratoluenesulfonic acid were charged in a reaction vessel equipped with a stirrer, a thermometer, a condenser, a water separator and a nitrogen gas introduction pipe, and were reacted at a reaction temperature of from 160 to 200° C. for 8 hours under nitrogen gas stream. By-product water was distilled off outside the system through a distillation-off pipe. The reaction product was cooled, washed with water and dehydrated to obtain Polyol (A-1). Polyol (A-1) obtained had a hydroxyl value of 34 and a viscosity of 5,000 (mPa·s/25° C.).

Synthesis Example 2

500 parts of a polyester polyol having a molecular weight of 500 obtained by condensing trimethylolpropane, ethylene glycol and adipic acid, and 2,384 parts of 12-hydroxystearic acid were reacted in the same manner as in Synthesis Example 1. Polyol (A-2) obtained had a hydroxyl value of 40 and a viscosity of 3,700 (mPa·s/25° C.).

Synthesis Example 3

300 parts of a polyester polyol having a molecular weight of 300 obtained by condensing trimethylolpropane, ethylene glycol and adipic acid, and 2,384 parts of 12-hydroxystearic acid were reacted in the same manner as in Synthesis Example 1. Polyol (A-3) obtained had a hydroxyl value of 46 and a viscosity of 2,100 (mPa·s/25° C.).

Synthesis Example 4

5,000 parts of a polyester polyol having a molecular weight of 5,000 obtained by condensing trimethylolpropane, ethylene glycol and adipic acid, and 2,384 parts of 12-hydroxystearic acid were reacted in the same manner as in Synthesis Example 1. Polyol (A-4) obtained had a hydroxyl value of 16 and a viscosity of 71,800 (mPa·s/25° C.).

Synthesis Example 5

213 parts of Polyol (A-1), 394 parts of Cosmonate PH, and 394 parts of Cosmonate M-200 were charged in a reaction vessel equipped with a stirrer, a thermometer and a nitrogen gas introduction pipe, and reacted at 80° C. for 3 hours under nitrogen stream, thereby obtaining a polyisocyanate component having a terminal NCO group content of 25% and a viscosity of 300 (mPa·s/25° C.).

Example 1

100 parts of Polyol (A-1) obtained in Synthesis Example 1 and 10 parts of Sovamol 750 (a product of Cognis Japan Ltd.) were uniformly mixed to prepare an active hydrogen-containing compound component.
100 parts of the active hydrogen-containing compound component thus prepared and 14.3 parts of Cosmonate M-200 as a polyisocyanate component were uniformly stirred and mixed for 3 minutes, and the resulting mixture was cast on a slate plate to prepare a 2 mm thick sheet. Mixing viscosity, workability, hardness of a cured product, elongation at break, heat resistance and wet heat resistance were measured. The test results are shown in Table 1.

Example 2

A 2 mm thick sheet was obtained in the same manner as in Example 1, except for using 25 parts of Sovamol 750 and 21.7 parts of Cosmonate M-200. Mixing viscosity, workability, hardness of a cured product, elongation at break, heat resistance and wet heat resistance were measured. The test results are shown in Table 1.

Example 3

A 2 mm thick sheet was obtained in the same manner as in Example 1, except for using 40 parts of Sovamol 750 and 27.5 parts of Cosmonate M-200. Mixing viscosity, workability, hardness of a cured product, elongation at break, heat resistance and wet heat resistance were measured. The test results are shown in Table 1.

Example 4

A 2 mm thick sheet was obtained in the same manner as in Example 2, except for using 100 parts of Polyol (A-1) obtained in Synthesis Example 2 in place of Polyol (A-1) and 22.9 parts of Cosmonate M-200. Mixing viscosity, workability, hardness of a cured product, elongation at break, heat resistance and wet heat resistance were measured. The test results are shown in Table 1.

Example 5

A 2 mm thick sheet was obtained in the same manner as in Example 2, except for using 23.7 parts of Cosmonate LL in place of Cosmonate M-200. Mixing viscosity, workability, hardness of a cured product, elongation at break, heat resistance and wet heat resistance were measured. The test results are shown in Table 1.

Example 6

A 2 mm thick sheet was obtained in the same manner as in Example 2, except for using 27.0 parts of the polyisocyanate component obtained in Synthesis Example 5 in place of Cosmonate M-200. Mixing viscosity, workability, hardness of a cured product, elongation at break, heat resistance and wet heat resistance were measured. The test results are shown in Table 1.

TABLE 1

|  | Example 1 | Example 2 | Example 3 | Example 4 | Example 5 | Example 6 |
| --- | --- | --- | --- | --- | --- | --- |
| Active hydrogen compound | | | | | | |
| Polyol (A-1) | 100 parts | 100 parts | 100 parts | — | 100 parts | 100 parts |
| Polyol (A-2) | — | — | — | 100 parts | — | — |
| Sovamol 750 | 10 parts | 25 parts | 40 parts | 25 parts | 25 parts | 25 parts |
| Polyisocyanate component | | | | | | |
| Cosmonate M-200 | 14.3 parts | 21.7 parts | 27.5 parts | 22.9 parts | — | — |
| Cosmonate LL | — | — | — | — | 23.7 parts | — |
| Prepolymer of Synthesis Example 5 | — | — | — | — | — | 27.0 parts |
| Mixing viscosity (mPa · s/25° C.) | 4600 | 3800 | 3000 | 2800 | 3700 | 3000 |
| Casting workability | ◯ | ◯ | ◯ | ◯ | ◯ | ◯ |
| Initial hardness (JIS A) | 28 | 57 | 84 | 60 | 52 | 45 |
| Elongation at break (%) | 100 | 80 | 62 | 75 | 105 | 98 |
| Heat resistance (JIS A) | 26 | 61 | 88 | 63 | 55 | 47 |
| Wet heat resistance | ◯ | ◯ | ◯ | ◯ | ◯ | ◯ |

Comparative Example 1

A 2 mm thick sheet was obtained in the same manner as in Example 2, except for using 100 parts of Polyol (A-3) obtained in Synthesis Example 3 in place of Polyol (A-1) and 24.0 parts of Cosmonate M-200. Mixing viscosity, workability, hardness of a cured product, elongation at break, heat resistance and wet-heat resistance were measured. The test results are shown in Table 2.

Comparative Example 2

A 2 mm thick sheet was obtained in the same manner as in Example 2, except for using 100 parts of Polyol (A-4) obtained in Synthesis Example 4 in place of Polyol (A-1) and 18.3 parts of Cosmonate M-200. Mixing viscosity, workability, hardness of a cured product, elongation at break, heat resistance and wet heat resistance were measured. The test results are shown in Table 2.

Comparative Example 3

A 2 mm thick sheet was obtained in the same manner as in Example 1, except for using 2.5 parts of Sovamol 750 and 9.8 parts of Cosmonate M-200. Mixing viscosity, workability, hardness of a cured product, elongation at break, heat resistance and wet heat resistance were measured. The test results are shown in Table 2.

Comparative Example 4

A 2 mm thick sheet was obtained in the same manner as in Example 1, except for using 70.0 parts of Sovamol 750 and 36.0 parts of Cosmonate M-200. Mixing viscosity, workability, hardness of a cured product, elongation at break, heat resistance and wet heat resistance were measured. The test results are shown in Table 2.

Comparative Example 5

A 2 mm thick sheet was obtained in the same manner as in Example 1, except for using 100 parts of Epol as the active hydrogen-containing compound and 12.2 parts of Cosmonate M-200 as the polyisocyanate compound. Mixing viscosity, workability, hardness of a cured product, elongation at break, heat resistance and wet heat resistance were measured. The test results are shown in Table 2.

Comparative Example 6

100 parts of D-300 and 25 parts of MN-300, as a polyol, were uniformly mixed to prepare an active hydrogen-containing compound.

Using 100 parts of the active hydrogen-containing compound thus prepared and 21.8 parts of Cosmonate M-200 as the polyisocyanate component, a 2 mm thick plate was obtained in the same manner as in Example 1. Mixing viscosity, workability, hardness of a cured product, elongation at break, heat resistance and wet heat resistance were measured. The test results are shown in Table 2.

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Active hydrogen compound | | | | | | |
| Polyol (A-1) | — | — | 100 parts | 100 parts | — | — |
| Polyol (A-3) | 100 parts | — | — | — | — | — |
| Polyol (A-4) | — | 100 parts | — | — | — | — |
| Epol | — | — | — | — | 100 parts | — |
| D-3000 | — | — | — | — | — | 100 parts |
| MN-300 | — | — | — | — | — | 25 parts |
| Sovamol 750 | 25 parts | 25 parts | 2.5 parts | 70 parts | — | — |
| Polyisocyanate component | | | | | | |
| Cosmonate M-200 | 24.0 parts | 18.3 parts | 9.8 parts | 36.0 parts | 12.2 parts | 21.8 parts |
| Mixing viscosity (mPa · s/25° C.) | 2000 | 48000 | 4900 | 2100 | 70000 | 600 |
| Casting workability | ○ | X | ○ | ○ | X | ○ |
| Initial hardness (JIS A) | 30 | 18 | 12 | 96 | 52 | 70 |
| Elongation at break (%) | 65 | 110 | 160 | 35 | 140 | 70 |
| Heat resistance (JIS A) | 10 | 22 | 8 | 99 or more | 48 | Dissolved |
| Wet heat resistance | ○ | Dissolved | Dissolved | ○ | ○ | Dissolved |

As is apparent from the results shown in Table 1, the polyurethane elastomer compositions obtained in Examples 1 to 6 have characteristics that heat resistance and wet heat resistance of a cured product are excellent, and a viscosity after two-part mixing is low, thereby casting workability is good, and physical properties of a cured product are excellent. Contrary to this, from the results of Table 2, in Comparative Example 1, hardness according to JIS A of a cured product after wet heat resistance test decreases from 30 to 10, and thus heat resistance is poor. In Comparative Example 2, viscosity after mixing is high, and casting workability is poor. Further, wet heat resistance deteriorates. In Comparative Example 3, wet heat resistance is poor. In Comparative Example 4, hardness of a cured product is high, and elongation at break is decreased. In Comparative Example 5, viscosity after mixing is high, and casting workability is poor. In Comparative Example 6, heat resistance and wet heat resistance are poor.

INDUSTRIAL APPLICABILITY

The two-part curing high-durable polyurethane elastomer composition of the invention has low viscosity after two-part mixing. Therefore, when the composition is executed with a trowel, a spatula, a roller or the like, inclusion of bubbles does not involve, and even when casting in a mold, inclusion of bubbles does not involve. As a result, fine spaces can be filled with the composition. Further, a cured product of the composition has low hardness and large elongation at break. As a result, the cured product has excellent physical properties. Further, a high-durable polyurethane elastomer composition having excellent heat resistance and wet heat resistance is provided, and industrial applicability is extremely high.

The invention claimed is:

1. A two-part curing polyurethane elastomer composition comprising (i) a polyisocyanate component and (ii) an active hydrogen-containing component, the active hydrogen-containing component (ii) comprising (A) a polyol having a hydroxyl value of from 25 to 55 obtained by reacting a castor oil fatty acid, 12-hydroxystearic acid, or a condensate of castor oil fatty acid or 12-hydroxystearic acid, with a polyol (X) having a molecular weight of from 400 to 1,500, and (B) a polyol having a hydroxyl value of from 100 to 500 obtained by ring opening an epoxidized fatty acid ester with a polyhydric alcohol, wherein the proportion of the polyol (B) is from 5 to 50 parts by weight per 100 parts by weight of the polyol (A).

2. The two-part curing polyurethane elastomer composition as claimed in claim 1, wherein the polyol (X) is a polyester polyol obtained by condensing adipic acid and a dihydric alcohol with trimethylolpropane.

3. The two-part curing polyurethane elastomer composition as claimed in claim 1, having hardness at 23° C. of JIS A 90 or lower, and elongation at break of 50% or higher.

4. The two-part curing polyurethane elastomer composition as claimed in claim 2, having hardness at 23° C. of JIS A 90 or lower, and elongation at break of 50% or higher.

* * * * *